United States Patent
Yanagisawa

(10) Patent No.: US 7,944,641 B2
(45) Date of Patent: May 17, 2011

(54) OVERSHOOT DURATION RANGE SELECTION IN A HARD DISK DRIVE

(75) Inventor: Craig Yanagisawa, Palo Alto, CA (US)

(73) Assignee: Samsung Electronics Co., Ltd., Suwon, Gyeonggi-Do (KR)

( * ) Notice: Subject to any disclaimer, the term of this patent is extended or adjusted under 35 U.S.C. 154(b) by 342 days.

(21) Appl. No.: 12/011,727

(22) Filed: Jan. 28, 2008

(65) Prior Publication Data

US 2009/0190247 A1      Jul. 30, 2009

(51) Int. Cl.
*G11B 5/02* (2006.01)
(52) U.S. Cl. .......................................... 360/68; 360/48
(58) Field of Classification Search .................. None
See application file for complete search history.

(56) References Cited

U.S. PATENT DOCUMENTS

| | | | | |
|---|---|---|---|---|
| 5,258,876 | A * | 11/1993 | Danner et al. | 360/45 |
| 5,657,176 | A * | 8/1997 | Moribe et al. | 360/31 |
| 6,870,697 | B2 * | 3/2005 | Ikekame et al. | 360/46 |
| 7,355,804 | B1 * | 4/2008 | Kassab et al. | 360/46 |
| 2003/0223143 | A1* | 12/2003 | Fujiwara et al. | 360/68 |
| 2004/0174627 | A1* | 9/2004 | Kim et al. | 360/31 |
| 2006/0072229 | A1* | 4/2006 | Yun et al. | 360/31 |

* cited by examiner

*Primary Examiner* — Jason C Olson

(57) ABSTRACT

A hard disk drive that stores data on a disk. An overshoot duration is used to write data onto the disk. The value of the overshoot duration is a function of the data rate, which can vary for different areas of the disk. For example, the data rate can be higher at an outer diameter of the disk than at an inner disk diameter. The overshoot duration can therefore be different when writing data at the outer diameter than the duration used to write data at the inner diameter. The data rate can be determined by analyzing a preamble of the data written onto the disk.

11 Claims, 3 Drawing Sheets

OVERSHOOT DURATION RANGE SELECTION IN A HARD DISK DRIVE

BACKGROUND OF THE INVENTION

1. Field of the Invention

The present invention relates to writing data onto a disk of a hard disk drive.

2. Background Information

Hard disk drives contain a plurality of magnetic heads that are coupled to rotating disks. The heads can magnetize and sense the magnetic fields of the disks to write and read data, respectively. The heads are coupled to a pivoting actuator arm that has a voice coil motor.

Data is typically stored on tracks that extend radially across the disk surfaces. The voice coil motor can be energized to pivot the actuator arm and move the heads to different track locations. Each track is typically divided into a number of sectors. Each sector contains at least one data field.

The disk drive typically writes data in blocks across a number of data sectors. Data is written by providing a write current to a coil of each head. The coil generates a magnetic flux that magnetizes the disk. Conversely, data is read through a read element in the head that senses a magnetic field of the disk. The signal sensed by the read element is provided to a pre-amplifier circuit. The signal is digitized and processed into a series of bits.

The read/write signal is processed using a number of read/write channel parameters. By way of example, there may be read channel parameters like cutoff frequency, gain, and boost; and write channel parameters like write current, overshoot duration, and write pre-compensation.

The rate at which data is written may vary for different locations of the disk. For example, the data rate at the outer diameter of the disk may be, twice that of the data rate at the disk inner diameter. Data rate is sometimes characterized by the width between bits also known as "T". The inner diameter may have a data rate of 2 T, while the outer diameter is written at a rate of T.

The overshoot duration write channel parameter is used to optimize the writing of data. The overshoot duration cannot be wider than T at the lowest data rate. To insure that this does not occur, the overshoot duration range is selected at the lowest data rate. Having an overshoot duration range set at the lowest data rate limits the ability to optimize writing at the higher data rates.

BRIEF SUMMARY OF THE INVENTION

A hard disk drive that stores data on a disk with a variable data rate. The drive includes a pre-amplifier circuit that determines the data rate, and then with the data rate determines an overshoot duration that is used to write data onto the disk.

DETAILED DESCRIPTION

Disclosed is a hard disk drive that stores data on a disk. An overshoot duration is used to write data onto the disk. The value of the overshoot duration is a function of the data rate, which can vary for different areas of the disk. For example, the data rate can be higher at an outer diameter of the disk than at an inner disk diameter. The overshoot duration can therefore be different when writing data at the outer diameter than the duration used to write data at the inner diameter. The data rate can be determined by analyzing a preamble of the data written onto the disk.

Figure 1:
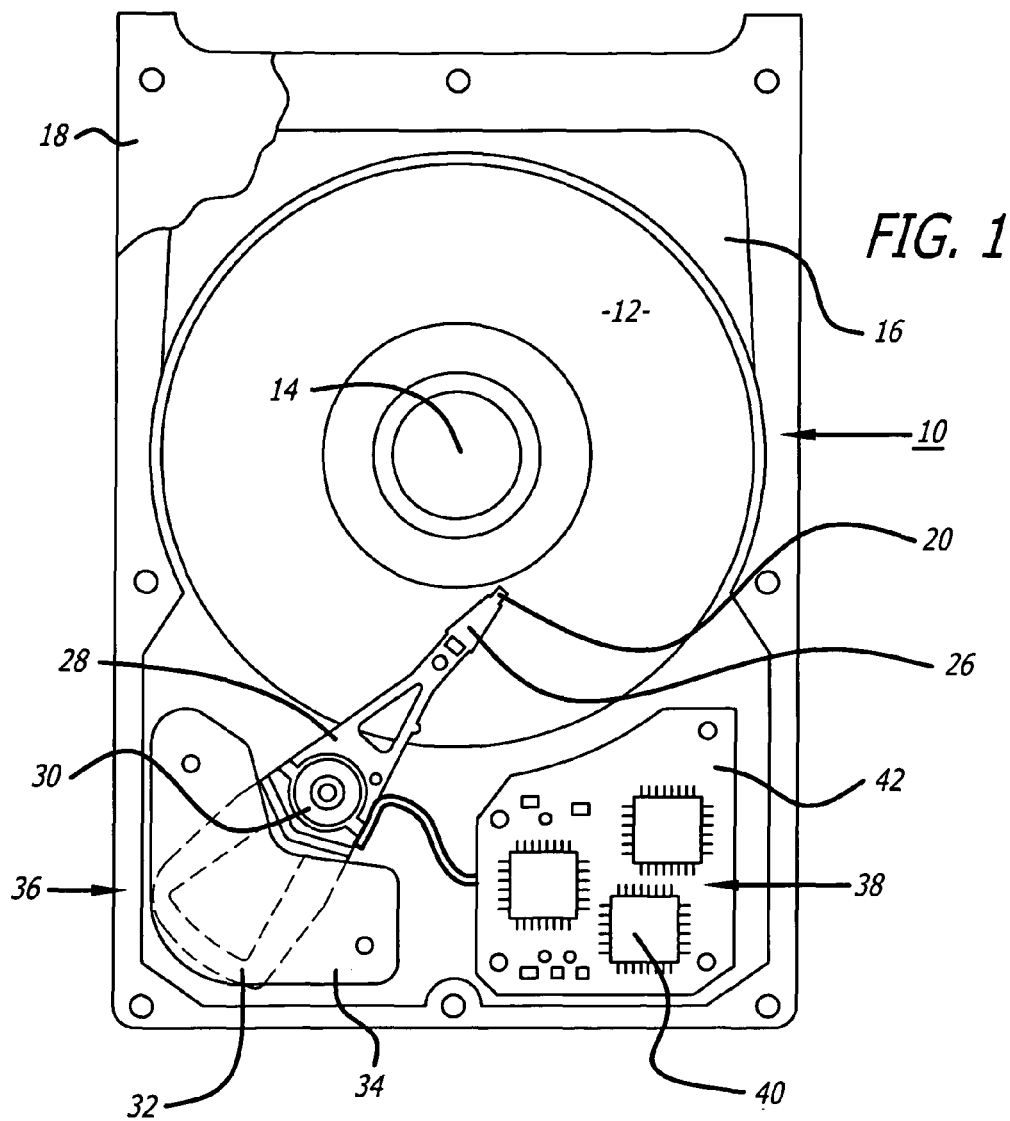
FIG. 1 is a top view of an embodiment of a hard disk drive.

Referring to the drawings more particularly by reference numbers, FIG. 1 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. Each head 20 may have separate write (not shown) and read elements (not shown). The heads 20 are gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 2:
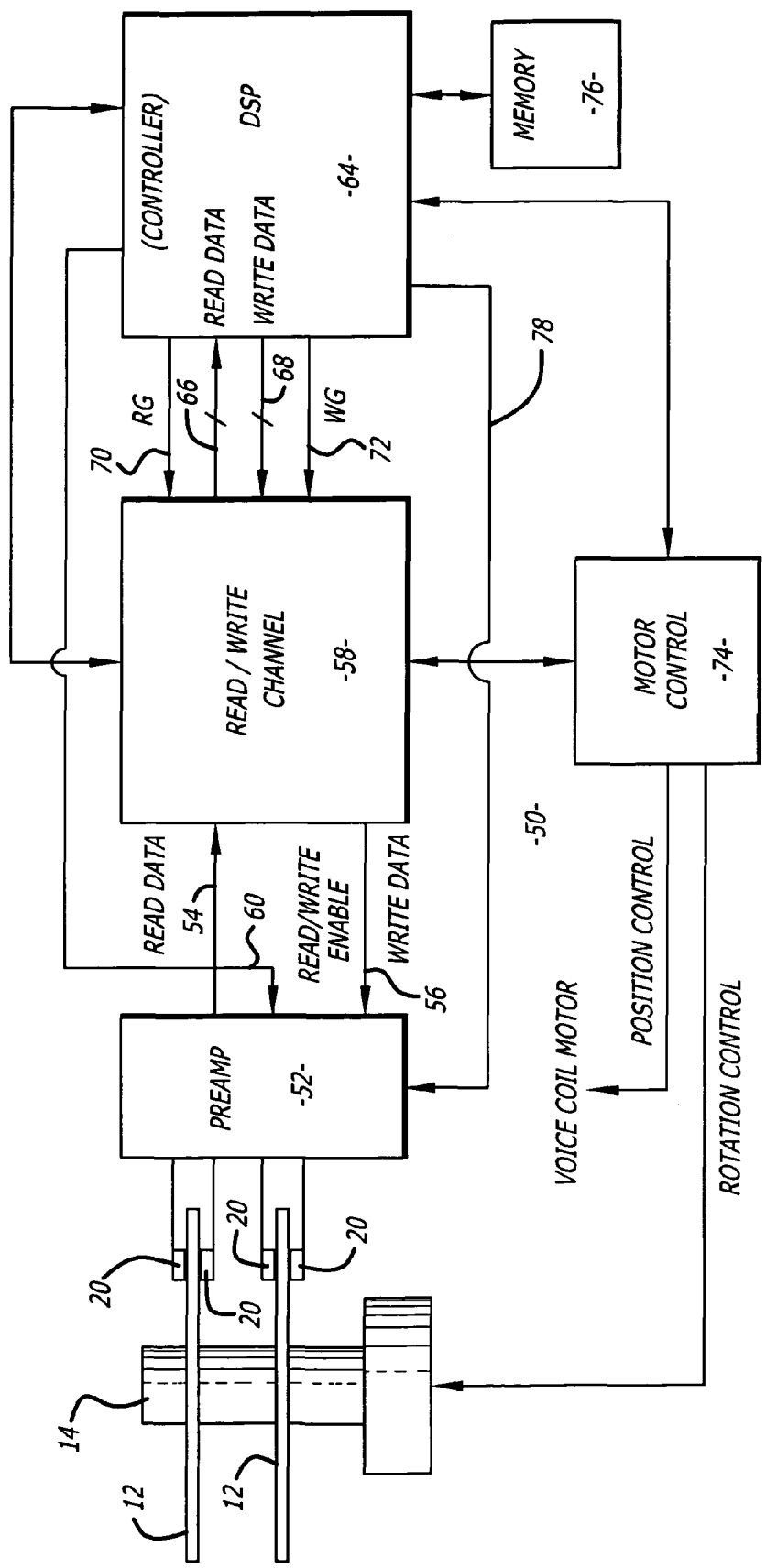
FIG. 2 is a schematic of an electrical circuit for the hard disk drive.

FIG. 2 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM").

Figure 3:
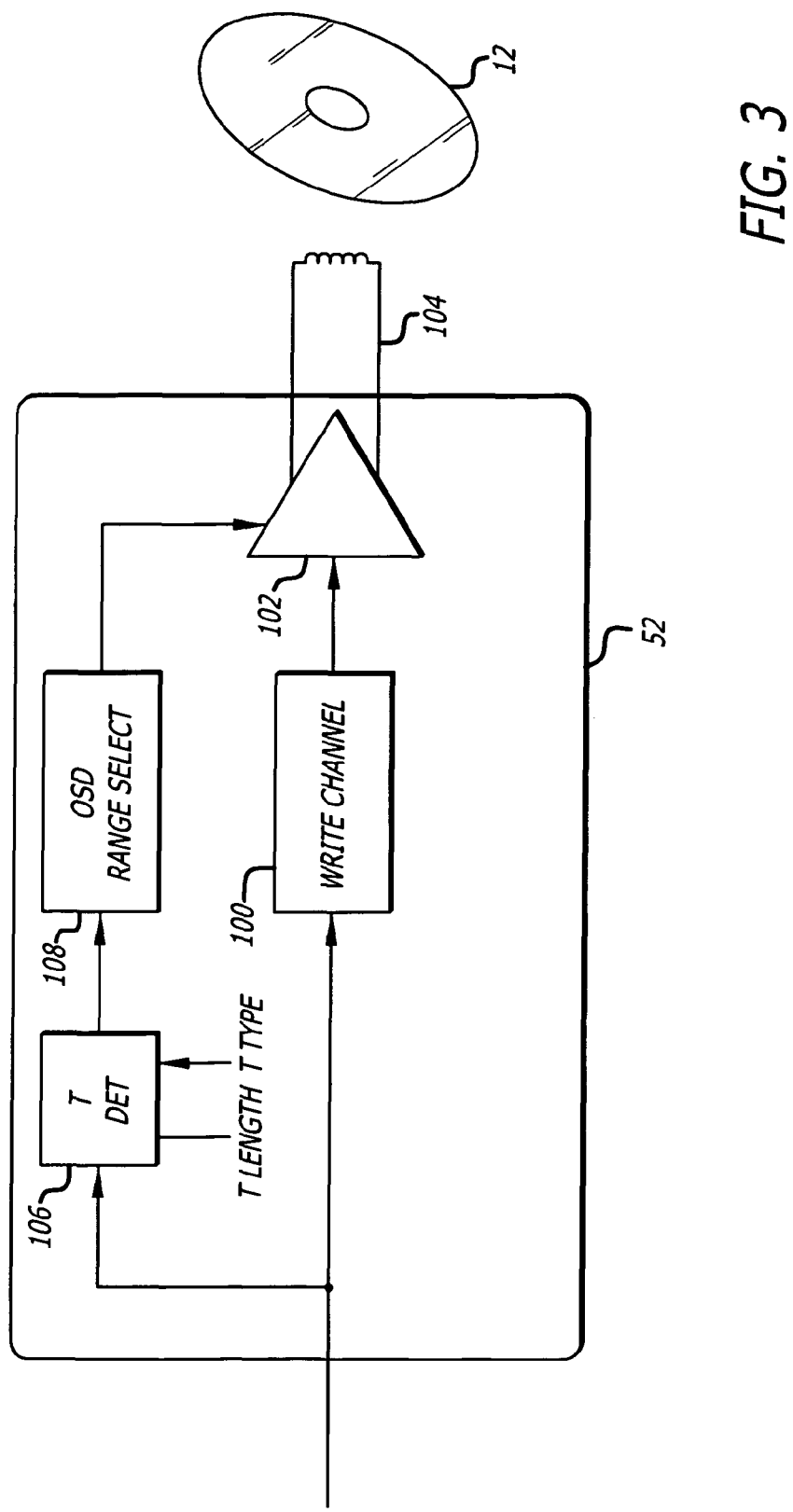
FIG. 3 is a schematic of a write channel of a preamplifier circuit of the drive.

FIG. 3 shows an embodiment of a portion of the preamplifier circuit 52. The circuit 52 includes a write channel 100 that is connected to a write driver 102. The write driver 102 is connected to the write element 104 of a head. The write element 104 writes data onto a disk 12. Data that is to be written is provided to the write channel 100.

The preamplifier 52 also includes a "T" detector 106 and an overshoot duration range selector 108. The overshoot duration is provided to the write driver 102 to optimize the write signal written by the write element 104.

Written data is preceded by a preamble. The preamble contains data written at a same rate at which the data will be written. The preamble is fed to both the write channel 100 and the T detector 106. The T detector 106 determines the data rate from the preamble. By way of example, the T detector 106 may determine the width between data bits within the preamble. The data rate is provided to the overshoot duration range selector 108. The selector 108 selects an overshoot duration based on the data rate determined by the T detector 106. By way of example, the overshoot duration may be selected from a table of overshoot values that are a function of data rate.

The overshoot duration is provided to the write driver 102. The overshoot duration is used to write the data onto the disk. The overshoot duration has a range that is a function of the data rate and can be varied for different portions of the disk.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
    a disk that contains data stored with a variable data rate;
    a spindle motor that rotates said disk;
    a head coupled to said disk;
    an actuator arm coupled to said head;
    a voice coil motor coupled to said actuator arm; and,
    a pre-amplifier circuit that determines said data rate for data to be stored on said disk from a preamble and then with said determined data rate determines an overshoot duration that is used to write said data onto said disk.

2. The disk drive of claim 1, wherein said data rate is greater at an outer diameter of said disk than at an inner diameter of said disk.

3. The disk drive of claim 1, wherein said overshoot duration is selected from a table.

4. The disk drive of claim 1, wherein said preamplifier circuit includes a data rate detector and a overshoot duration selector coupled to a driver that is connected to a write element of said head.

5. A hard disk drive, comprising:
    a disk that contains data stored with a variable data rate;
    a spindle motor that rotates said disk;
    a head coupled to said disk;
    an actuator arm coupled to said head;
    a voice coil motor coupled to said actuator arm; and,
    circuit means for determining said data rate for data to be stored on said disk from a preamble and then with said determined data rate determining an overshoot duration that is used to write said data onto said disk.

6. The disk drive of claim 5, wherein said data rate is greater at an outer diameter of said disk than an inner diameter of said disk.

7. The disk drive of claim 5, wherein said overshoot duration is selected from a table.

8. The disk drive of claim 5, wherein said circuit means includes a data rate detector and a overshoot duration selector coupled to a driver that is connected to a write element of said head.

9. A method for writing data on a disk of a hard disk drive, comprising:
    determining a data rate of data that is to be stored on a disk from a preamble;
    determining an overshoot duration based on the determined data rate; and,
    writing data on the disk using the overshoot duration.

10. The method of claim 9, wherein the data rate is greater at an outer diameter of the disk than at an inner diameter of the disk.

11. The method of claim 9, wherein the overshoot duration is determined by selecting the overshoot duration from a table.

* * * * *